(12) United States Patent
Mukter-Uz-Zaman et al.

(10) Patent No.: US 8,987,973 B2
(45) Date of Patent: Mar. 24, 2015

(54) ENERGY HARVESTER

(75) Inventors: A. S. M. Mukter-Uz-Zaman, Kuala Lumpur (MY); Masuri Othman, Kuala Lumpur (MY); Mohammad Shaharia Bhuyan, Kuala Lumpur (MY); Agus Santoso Tamsir, Kuala Lumpur (MY); Suraya Sulaiman, Kuala Lumpur (MY)

(73) Assignee: Mimos Berhad, Kuala Lumpur (MY)

( * ) Notice: Subject to any disclaimer, the term of this patent is extended or adjusted under 35 U.S.C. 154(b) by 1005 days.

(21) Appl. No.: 13/119,885

(22) PCT Filed: Sep. 10, 2009

(86) PCT No.: PCT/MY2009/000142
§ 371 (c)(1),
(2), (4) Date: Sep. 18, 2012

(87) PCT Pub. No.: WO2010/033012
PCT Pub. Date: Mar. 25, 2010

(65) Prior Publication Data
US 2013/0057111 A1    Mar. 7, 2013

(30) Foreign Application Priority Data
Sep. 18, 2008    (MY) ................ PI20083637

(51) Int. Cl.
H01L 41/113    (2006.01)
H02N 2/18      (2006.01)

(52) U.S. Cl.
CPC ................... H02N 2/186 (2013.01)
USPC ........................................ 310/339

(58) Field of Classification Search
USPC ........................................ 310/339
See application file for complete search history.

(56) References Cited

U.S. PATENT DOCUMENTS

| 8,067,878 | B1* | 11/2011 | Lu et al. ................ 310/339 |
| 2006/0087200 | A1 | 4/2006 | Sakai |
| 2008/0092937 | A1 | 4/2008 | Mitchell et al. |
| 2008/0100180 | A1 | 5/2008 | Clingman et al. |
| 2010/0207491 | A1* | 8/2010 | Gammaitoni et al. ........ 310/339 |
| 2010/0308691 | A1* | 12/2010 | Hayamizu .................. 310/339 |
| 2012/0074815 | A1* | 3/2012 | Jean-Mistral ............... 310/339 |
| 2013/0062999 | A1* | 3/2013 | Muker-Uz-Zaman et al. .......... 310/339 |
| 2013/0068302 | A1* | 3/2013 | Muker-Uz-Zaman et al. .......... 136/259 |

FOREIGN PATENT DOCUMENTS

| JP | 11303726 | 11/1999 |
| JP | 2005273644 | 10/2005 |
| JP | 2008192944 | 8/2008 |
| WO | 2007070022 | 6/2007 |

* cited by examiner

Primary Examiner — Thomas Dougherty
(74) Attorney, Agent, or Firm — Bill C. Panagos; J. Scott Martin; Butzel Long, PC

(57) ABSTRACT

An energy harvester comprising a base; one or more first resilient means mounted on the base; a hollow chamber having a mounting point pivotally attached to the first resilient means; a hollow member enclosed within the hollow chamber being attached to one or more second resilient means extending from the mounting point in static equilibrium such that the center of mass of the hollow member is aligned with the second resilient means at a vertical axis; a plurality of piezoelectric material-built cantilevers mounted on the hollow member; an integrated circuit connecting the hollow chamber, hollow member, and piezoelectric material-built cantilevers with at least one of a primary storage and a device, wherein the energy is harvested through vibration of the plurality of piezoelectric material-built cantilevers at its approximately resonant frequency, reciprocation of the hollow chamber and the hollow member upon application of a force.

11 Claims, 5 Drawing Sheets

ENERGY HARVESTER

CROSS REFERENCE TO RELATED APPLICATIONS

The present application is a 35 U.S.C. §371 national stage filing of International Patent Application No. PCT/MY 2009/000142, filed Sep. 10, 2009, and through which priority is claimed to Malaysian Patent Application No. PI 20083637, filed Sep. 18, 2008, the disclosures of which are incorporated herein by reference in their entireties.

FIELD OF INVENTION

The present invention relates to an energy harvester. In more specific, the disclosed invention capable of harvesting energy through mechanical vibrating force derives from the surrounding environment and other energy sources such as solar, radio frequency, thermal and the like.

BACKGROUND OF THE INVENTION

With rapid development of remote and wireless sensor network, continuous power supply is becoming the limiting factor for the lifetime of the device as depletion of the attached battery power. For example, in precision agriculture, sensors are normally located in a distant plantation and powered up by a battery which has limited capacity and lifetime to supply power for the sensors. Therefore, for a self-contained sensor or processing circuit to attain truly autonomous, renewable on-board power supply is required. One way to eliminating use of exhaustible battery from the device is through continuous energy harvesting from a sustainable source. Energy harvesting is the process by which energy is captured and stored also known as power harvesting or energy scavenging. Such approach is especially useful for small autonomous devices, like those used in sensor networks so that they are portable and require little power. However, energy harvesting involving a single source is usually insufficient to completely and continuously to power the electronic system. Therefore, it is desired to have a hybrid energy harvesting system to acquire energy from different sustainable source.

Worldwide patent application no. 2007070022 claims an ambient energy harvesting system comprising a magnetic flux-generating assembly, a coil positioned adjacent to the magnetic flux-generating assembly, and a cantilevered arm which vibration enables relative movement between magnetic flux-generating assembly and the coil to generate an electric current in the coil.

Mitchell et al. provides an energy harvesting device in United States Patent publication no 2008092937. The claimed device comprises a fastening device, a first thermally-conductive element engaging the fastening device, a thermoelectric device disposed in thermal contact with the first thermally-conductive element, a thermoelectric device disposed in thermal contact with the first thermally conductive element, and a second thermally-conductive element disposed in thermal contact with the thermoelectric device.

Further in United States patent application no 2008100180, an apparatus capable of harvesting energy through small vibration amplitudes over a wide frequency band. The disclosed apparatus comprises a beam including an electrically responsive material with attachment structure for enabling the beam to be coupled to an external structure experiencing vibration; a force biasing member disposed adjacent the beam; a support structure for engaging each of the beam and the biasing member to apply compressive force wherein the beam adapted to flex in response to vibration from the external structure to generate electrical signal.

SUMMARY OF THE INVENTION

The present invention aims to provide an energy harvester which capable of continuously harvesting energy from the surrounding environment. The harvested energy may then subsequently be used to power an electronic device.

Further object of the present invention is to disclose an energy harvester able to harvest energy from more than one source. In more particular, the energy harvester may preferably acquire energy from kinetic movement, solar, thermal or even radio frequency in order to obtain sufficient energy for powering up an electronic device.

Still another object of the present invention is to achieve fully autonomous for a remote electronic device through coupling with the disclosed energy harvester to acquire sufficient power for operation.

At least one of the preceding objects is met, in whole or in part, by the present invention, in which one of the embodiments of the present invention is an energy harvester (100) comprising a base (110); one or more first resilient means (120) mounted on the base (110); a hollow chamber (130) having a mounting point (131) pivotally attached to the first resilient means (120) in static equilibrium in such a way that center of mass of the hollow chamber (130) is aligned with the first resilient means (120) at the vertical axis; a hollow member (140) enclosed within the hollow chamber (130) being attached to one or more second resilient means (150) extending from the mounting point (131) in static equilibrium that center of mass of the hollow member (140) is aligned with the second resilient means (150) at the vertical axis; a plurality of piezoelectric material-built cantilevers (160) mounted on the hollow member (140) and spaced apart from one another in a predetermined gap at the vertical plane that the piezoelectric material-built cantilevers (160) are varied in length and/or center of mass; a primary storage (170) associated with the hollow chamber (130), the hollow member (140) and the plurality of piezoelectric material-built cantilevers (160) for storing harvested energy through an integrated circuit; wherein the energy is harvested through vibration of the plurality of piezoelectric material-built cantilevers (160), reciprocation of the hollow chamber (130) and the hollow member (140) upon applying kinetic force.

In order to harvest energy from other available source, another preferred embodiment of the present invention includes an photovoltaic cells (180) attached onto surfaces of hollow chamber (130) to harvest solar energy and associated with the integrated circuit to store harvested energy into the primary storage (170). Subsequently, it is preferable that the hollow chamber (130) is made of transparent material thus permitting entry of solar power into hollow chamber reaching the solar cell contained within.

Similarly, in another preferred embodiment, a means for harvesting thermal energy is (190) associated with the integrated circuit to store harvested energy into the primary storage (170). Particularly, the means of harvesting thermal energy (190) is one or more elongated member formed by direct contacting two different electric conducting material and subjecting the two different electric conducting material different temperature respectively to harvest energy.

In other aspect of the present invention, a radio frequency harvesting means (200) may be attached onto the hollow chamber (130) for harvesting radio frequency energy and associated with the integrated circuit to store harvested energy into the primary storage (170). Similarly, the radio frequency harvesting means (200) can be fabricated onto surface of the hollow member (140) for harvesting radio frequency energy and associated with the integrated circuit to store harvested energy into the primary storage (170).

To optimise yield of the harvested energy, in one embodiment, tips (161) of the plurality of piezoelectric material-built cantilevers (160) possess proof mass (162) which induce greater vibration on the cantilevers (160) hence the energy harvested.

For miniaturize the size of the energy harvester into a microelectromechanical system (MEMS), the primary storage (170) is integrated with the base (110) forming a single unit in the energy harvesting system. Preferably, the primary storage (170) comprising capacitor and/or super capacitor to be charged by the harvested energy. Moreover, the present invention may further comprise a secondary storage (210), preferably rechargeable battery, to receive harvested energy from the primary storage and store harvested energy in the electrochemical form.

DETAILED DESCRIPTION OF THE INVENTION

Figure 1:
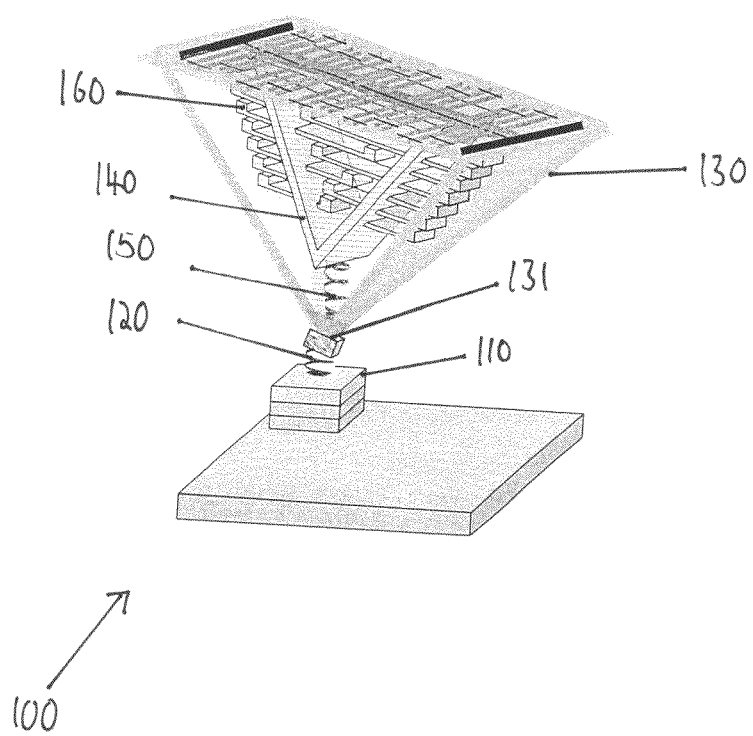
FIG. 1 is a perspective view of one embodiment of the present invention.

It is to be understood that the present invention may be embodied in other specific forms and is not limited to the sole embodiment described herein. However modification and equivalents of the disclosed concepts such as those which readily occur to one skilled in the art are intended to be included within the scope of the claims which are appended thereto.

The present invention involves an energy harvester (100) comprising a base (110); one or more first resilient means (120) mounted on the base (110); a hollow chamber (130) having a mounting point (131) pivotally attached to the first resilient means (120) in static equilibrium in such a way that center of mass of the hollow chamber (130) is aligned with the first resilient means (120) at the vertical axis; a hollow member (140) enclosed within the hollow chamber (130) being attached to one or more second resilient means (150) extending from the mounting point (131) in static equilibrium that center of mass of the hollow member (140) is aligned with the second resilient means (150) at the vertical axis; a plurality of piezoelectric material-built cantilevers (160) mounted on the hollow member (140) and spaced apart from one another in a predetermined gap at the vertical plane that the piezoelectric material-built cantilevers (160) are varied in length and/or center of mass; a primary storage (170) associated with the hollow chamber (130), the hollow member (140) and the plurality of piezoelectric material-built cantilevers (160) through an integrated circuit for storing harvested energy; wherein the energy is harvested via vibration of the plurality of piezoelectric material-built cantilevers (160) at its approximately resonant frequency, reciprocation of the hollow chamber (130) and the hollow member (140) upon applying kinetic force.

Referring to FIG. 1, the illustrated hollow chamber (130) is in a prismatic shape. However, it is not the intention of the inventors to rule out other possible forms or shapes of the hollow chamber (130). Other shapes, such as rectangular, conical, triangular, polygonal, and circular shapes are also possible. It is important to note herein that the hollow chamber (130) preferably possesses a shape that allows the hollow chamber (130) to be mounted onto the first resilient means (120) in static equilibrium when there are no external forces applied, without having the first resilient means (120) bent to one side due to imbalance in mass distribution of the hollow chamber (130) while being mounted onto the first resilient means (120). Particularly, in the static equilibrium state, the center of mass of the hollow chamber (130) of the present invention shall solely be supported or weigh on the first resilient means (120) at the vertical axis, which means the center of mass of the hollow chamber (130) is aligned with the first resilient means (120) at the vertical axis as in the embodiment shown in FIG. 1. Yet, elasticity in the first resilient means (120) allows the hollow chamber (130) to reciprocate on the first resilient means (120) upon application of an external force; thus, the reciprocating movement generates energy to be stored. For converting the kinetic energy to electrical energy to be stored, a solenoid MEMS actuator may be employed in the preferred embodiment. More preferably, as in FIG. 1, the hollow chamber (130) has most of its mass distributed away from the mounting point (131) or the first resilient means (120) thereby increasing the sensitivity of the disclosed energy harvester, promoting reciprocating movement of the hollow chamber (130) upon even the slightest force. For example, instead of mounting a cube-shaped hollow chamber (130) at its base, preferably in the present invention, the cube-shaped hollow chamber is diagonally mounted onto the first resilient means (120) at one corner or tip to promote reciprocating movement of the hollow chamber (130).

In another embodiment where the mass of the hollow chamber is not evenly distributed while being mounted onto the first resilient means (120), still it is possible to have the center of mass aligned with the first resilient means (120) as long as the first resilient means (120) is mechanically strong to counteract the force caused by the mass. Though in such embodiment, the hollow chamber tends to sway forward to one side rather than another, still, kinetic energy can be harvested.

Similarly, in the preferred embodiment, the hollow member (140) in the present invention can adapt different possible forms or shapes as long the static equilibrium is established with the second resilient means (150) when there is no external force applied onto it. Though enclosed within the hollow chamber (130), there is no physical contact between the hollow member (140) and hollow chamber (130) either in the stationary state or during the reciprocation. The hollow member (140) serves as a secondary harvester for kinetic energy under condition which vibration of the first resilient means (120) and the hollow chamber (130) is limited by the environmental factors. As setting forth as to the hollow chamber (130), the mass of the hollow member (140) is preferably distributed away from the point where the point attaching with the second resilient means (150) to enhance susceptibility towards the surrounding kinetic force to be harvested. In the FIG. 1, one of the embodiments adapts an inverted triangular shape for the hollow member (140).

Of the most preferred embodiment, the first (120) and second resilient means (150) in the present invention is a spring or the like. Relying on the respective mass and size of the hollow member (140) and hollow chamber (130), the making material, sustaining capabilities, elasticity, deflection angle of the spring can be varied from one embodiment to another. For example, the mass and size of the hollow member (140) and hollow chamber (130) can be manufacture in large size to harvest more energy yet may be miniaturized to fit in micro scale of a MEMS such as wireless sensor.

Figure 2:
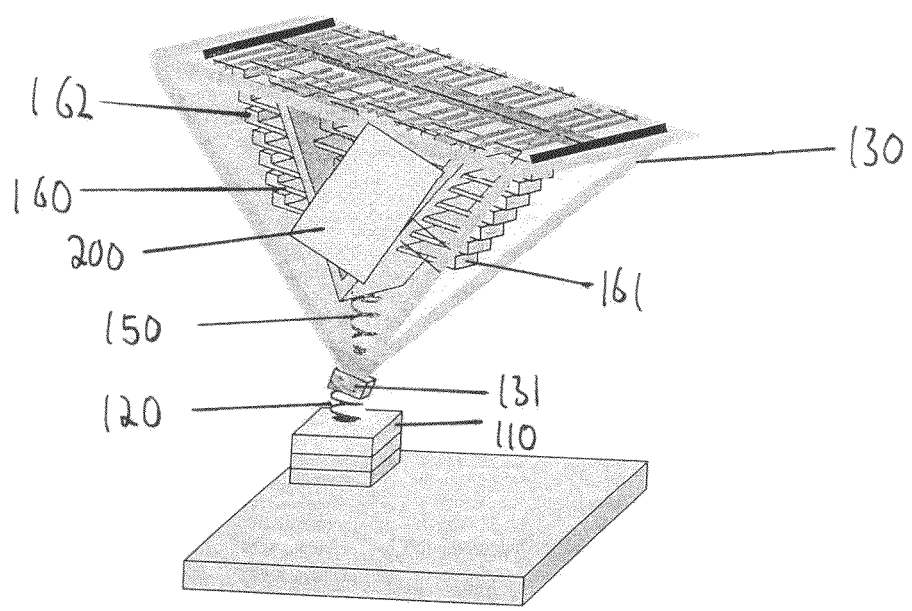
FIG. 2 is a perspective view of the embodiment shown in FIG. 1 integrated with an radio frequency receiver.

In order to harvest solar energy from sunlight exposure or other light sources, the hollow chamber is made of transparent material in whole or in part to permit light entry. The transparent material can be glass or of plastic materials such as acrylic and polycarbonate. Preferably, plastic material is used owing to its better tensile strength over glass indicating greater resistance over applied force. For the embodiment in which only partial of the hollow chamber is built with the transparent material, the location of such portion shall be located at the site where sunlight exposure is optimum like the top surface in the embodiment shown in FIGS. 1 and 2.

As in foregoing, the present invention aims to harvest energy from light sources as well. As such, in the preferred embodiment, a layer of photovoltaic cells (180) is attached onto surfaces of hollow chamber (130) to harvest electromagnetic energy, preferably solar energy, and associated with the integrated circuit to store harvested energy into the primary storage (170). Specifically, the photovoltaic cells (180) is preferably enclosed within the hollow chamber (130) as well to protect it from accidental physical damage if disposed externally of the hollow member (130). To acquire optimal, the layer of photovoltaic cells is disposed or mounted on the area where it can be exposed to the electromagnetic radiation at the most. For example, on the top surface of the embodiment presented in FIGS. 1 and 2.

Further embodiment, the disclosed energy harvester has integrated with a means for harvesting thermal energy (190) associated with the integrated circuit to store harvested energy into the primary storage (170). Basically, the means for harvesting thermal energy (190) in the present invention is fabricated and carries its function based on Seebeck effect. Preferably, the means of harvesting thermal energy (190) is one or more elongate member formed by direct contacting two different electric conducting material and subjecting the two different electric conducting material different temperature respectively to harvest energy. In more specific, current will be generated when two different electric conducting materials are placed together contacting each other at one point but subjected to two different temperatures respectively. In the present invention, one of the electric conducting material is preferably placed outside the hollow chamber (130) and another is placed within the hollow chamber. Such design is especially useful in harvesting thermal energy as temperature within the hollow chamber (130) shall be much higher comparing the external temperature due to lack of air flow within the hollow chamber (130). Nonetheless, the harvesting thermal energy (190) is connected to the integrated circuit to direct the generated current to the primary storage (170).

Figure 5:
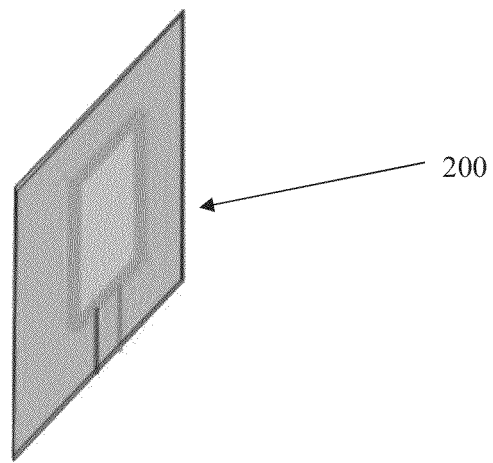
FIG. 5 shows the perspective view of the radio frequency energy harvesting antenna.
Figure 6:
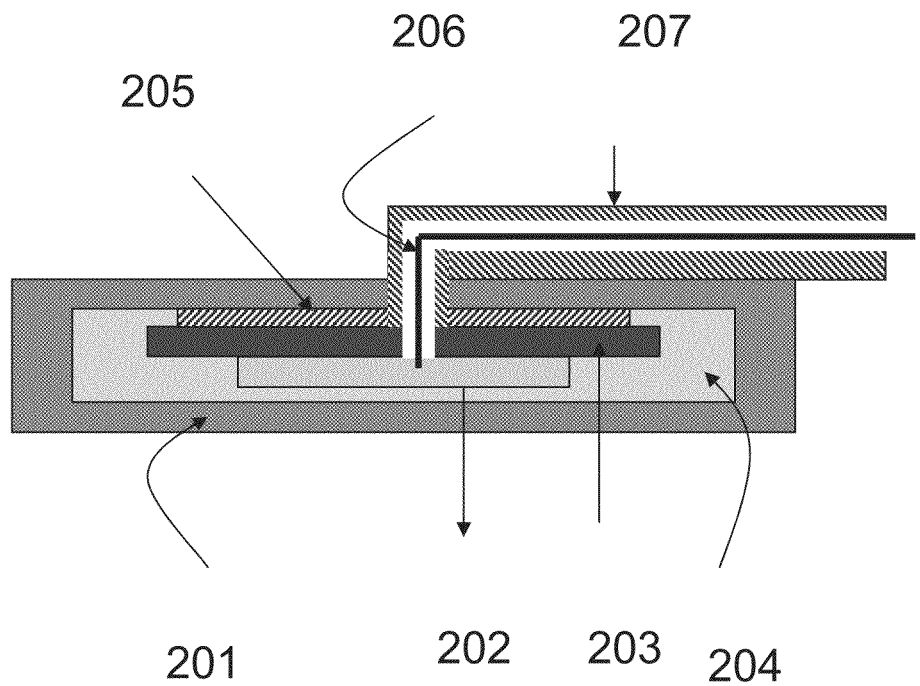
FIG. 6 shows the cross-sectional view of the radio frequency energy harvesting antenna.
Figure 7:
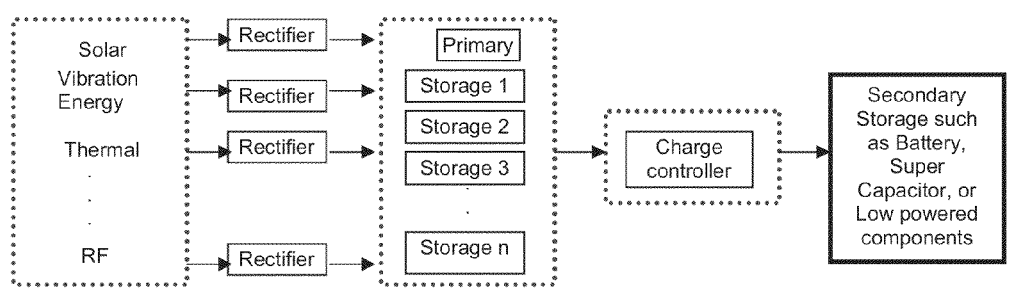
FIG. 7 shows a block diagram of one embodiment of the present invention.

In one embodiment, a radio frequency harvesting means (200) fabricated onto surface of the hollow member (140) for harvesting radio frequency energy and associated with the integrated circuit to store harvested energy into the primary storage (170). For another alternative embodiment, radio frequency harvesting means (200) attached onto the hollow chamber (130) for harvesting radio frequency energy and associated with the integrated circuit to store harvested energy into the primary storage (170). It is preferable that the radio frequency harvesting means (200) is attached at the side surfaces of the hollow chamber (130) as the top surface may be mounted by the photovoltaic cells (180). Pursuant to one preferred embodiment, the radio frequency harvesting means (200) is illustrated in both FIGS. 5 and 6. Referring to FIG. 6, the radio frequency harvesting means shown comprises an antenna (202) spaced apart from a ground material (205) by an insulator (203) which are covered by a layer of protective shield (201). Void space (204) is provided in between the protective layer and the antenna. Furthermore, both the antenna (202) and the ground material are connected to the circuit for electricity generation.

Figure 3:
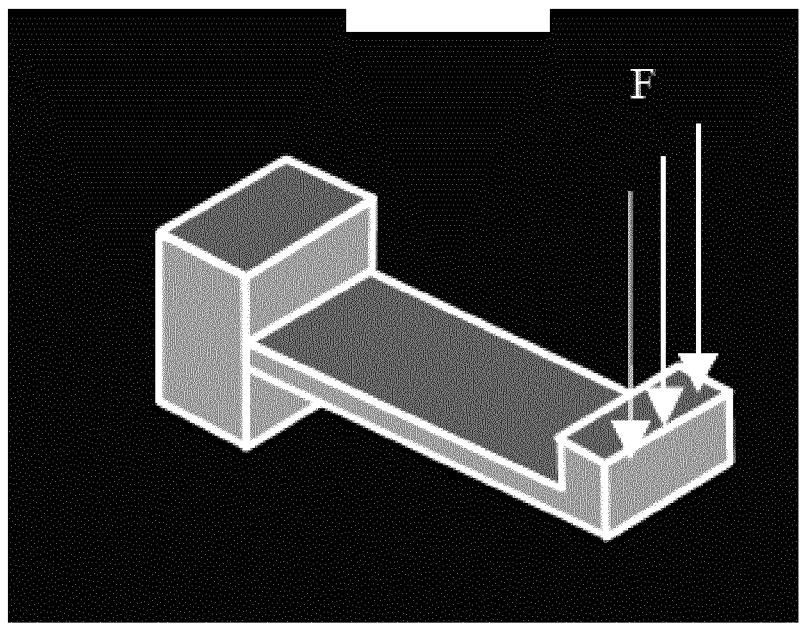
FIG. 3 is an enlarged view of the cantilever.
Figure 4:
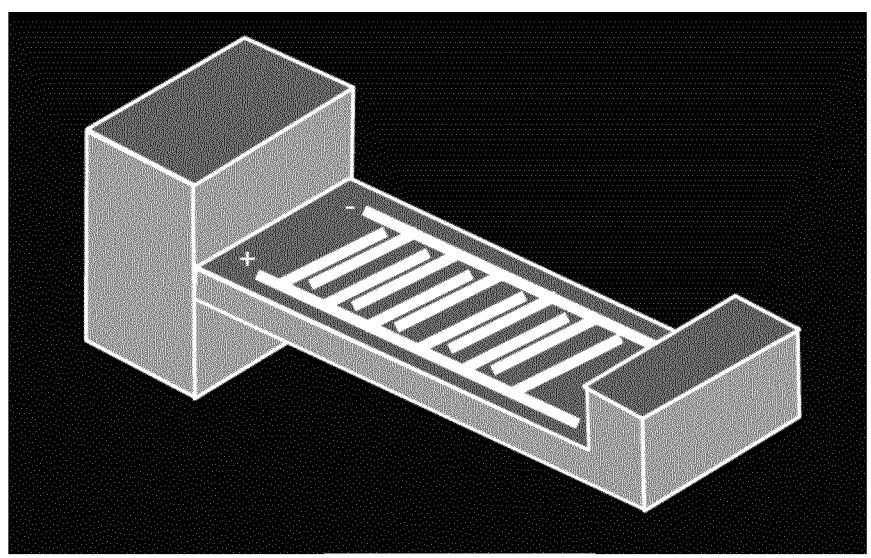
FIG. 4 shows an electron collector used in one embodiment for collecting the electron generated through harvesting the energy.

Attention shall now drawn to the fact that the cantilevers built on the hollow member can convert kinetic energy to electrical current owing to the characteristic which the piezoelectric material is capable of generating electrical potential upon applying mechanical force to it. For harvesting the electrical potential, interdigitated electrodes is preferably employed as the electrical potential collector to direct the generated electric to the primary storage. In the present invention, the cantilevers will vibrate upon movement of the hollow member (140). It was found by the inventors that proof mass (162) at the tips (161) of the plurality of piezoelectric material-built cantilevers (160) can increase the level of vibration and so does the energy harvested. Moreover, it is known the cantilevers will have greater vibration at its resonant frequency. Therefore, proof mass can be deposited along the length of the cantilevers to modify or adjust its resonant frequency. In the most preferred embodiment, cantilevers in the present invention is modified to have different resonant frequency for each single cantilever to detect and vibrate over wide range of frequency. Possibly, the resonant frequency of each cantilever can be varied through fabricating the cantilevers at different length as in FIG. 3.

According to another embodiment, the primary storage (170) is integrated with the base (110) forming a single unit to reduce the size or miniaturize the disclosed energy harvester. Thus allowing the disclosed invention to be fitted for MEMS application.

Further embodiment in the present invention preferably has primary storage (170) comprising capacitor and/or super capacitor. The energy harvested is stored in the form of electrical potential. Moreover, a secondary storage (210) is incorporated in the subsequent embodiment to receive harvested energy from the primary storage and store harvested energy. Specifically, the secondary storage in prepared in the form of rechargeable battery. Once the electrical potential in the primary storage exceeds its maximum capacity, the energy will be drained out to the rechargeable battery. From there, the electricity from the rechargeable battery is used to power up any attached instruments such as wireless sensor.

The present disclosure includes as contained in the appended claims, as well as that of the foregoing description. Although this invention has been described in its preferred form with a degree of particularity, it is understood that the present disclosure of the preferred form has been made only by way of example and that numerous changes in the details of construction and the combination and arrangements of parts may be resorted to without departing from the scope of the invention.

The invention claimed is:

1. An energy harvester comprising:
   a base;
   one or more first resilient means mounted on the base;
   a hollow chamber having a mounting point pivotally attached to the first resilient means in static equilibrium in such a way that center of mass of the hollow chamber is aligned with the first resilient means at vertical axis;
   a hollow member enclosed within the hollow chamber being attached to one or more second resilient means extending from the mounting point in static equilibrium that center of mass of the hollow member is aligned with the second resilient means at the vertical axis;
   a plurality of piezoelectric material-built cantilevers mounted on the hollow member and spaced apart from one another in a predetermined gap at the vertical plane that the piezoelectric material-built cantilevers are varied in length and/or center of mass;
   an integrated circuit connected to at least one of the hollow chamber, the hollow member, and the plurality of piezoelectric material-built cantilevers, and at least one of a primary storage and a device, wherein the integrated circuit directs harvested energy from at least one of the hollow chamber, the hollow member, and the plurality of piezoelectric material-built cantilevers to at least one of the primary storage and the device; and
   wherein the energy is harvested through vibration of the plurality of piezoelectric material-built cantilevers, reciprocation of the hollow chamber and the hollow member upon application of a force.

2. An energy harvester according to claim 1, wherein the hollow chamber is made of transparent material.

3. An energy harvester according to claim 1, further comprising photovoltaic cells attached onto surfaces of the hollow chamber to harvest solar energy, wherein the photovoltaic cells are connected to the integrated circuit to direct the harvested energy to at least one of the primary storage and the device.

4. An energy harvester according to claim 1, further comprising a means for harvesting thermal energy, wherein the means for harvesting thermal energy is connected to the integrated circuit to direct the harvested energy to at least one of the primary storage and the device.

5. An energy harvester according to claim 4, wherein the means of harvesting thermal energy is one or more elongated members formed by directly contacting two different electric conducting materials and subjecting the two different electric conducting materials to different temperatures.

6. An energy harvester according to claim 1, further comprising a radio frequency harvesting means attached onto the hollow chamber for harvesting radio frequency energy, wherein the radio frequency harvesting means attached onto the hollow chamber is connected to the integrated circuit to direct the harvested energy to at least one of the primary storage and the device.

7. An energy harvester according to claim 1, further comprising a radio frequency harvesting means fabricated onto a surface of the hollow member for harvesting radio frequency energy, wherein the radio frequency harvesting means fabricated onto a surface of the hollow member is connected to the integrated circuit to direct harvested energy to at least one of the primary storage and the device.

8. An energy harvester according to claim 1, wherein tips of the plurality of piezoelectric material-built cantilevers possess proof masses.

9. An energy harvester according to claim 1, wherein the primary storage is integrated with the base.

10. An energy harvester according to claim 1, wherein the primary storage comprises a capacitor and/or super capacitor.

11. An energy harvester according to claim 1, further comprising a secondary storage to receive harvested energy from the primary storage and store harvested energy.

\* \* \* \* \*